US008050371B2

United States Patent
Garg et al.

(10) Patent No.: US 8,050,371 B2
(45) Date of Patent: Nov. 1, 2011

(54) METHOD AND SYSTEM FOR COMPENSATING FOR THE EFFECT OF PHASE DRIFT IN A DATA SAMPLING CLOCK

(75) Inventors: Rahul Garg, Faridabad (IN); Nandan Tripathi, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 864 days.

(21) Appl. No.: 12/098,453

(22) Filed: Apr. 7, 2008

(65) Prior Publication Data

US 2008/0267332 A1    Oct. 30, 2008

(30) Foreign Application Priority Data

Apr. 27, 2007  (IN) .............................. 932/DEL/2007

(51) Int. Cl.
    *H04L 7/04*       (2006.01)

(52) U.S. Cl. ....................................... 375/355; 375/371
(58) Field of Classification Search ................ 375/226, 375/354, 355, 371, 373; 714/704
See application file for complete search history.

(56) References Cited

U.S. PATENT DOCUMENTS

| 6,693,954 | B1  |   | 2/2004 | King et al. |
|---|---|---|---|---|
| 2002/0085656 | A1 | * | 7/2002 | Lee et al. ...................... 375/355 |
| 2004/0158420 | A1 | * | 8/2004 | Kim et al. ....................... 702/66 |
| 2005/0171994 | A1 | * | 8/2005 | Proano et al. .................. 709/200 |
| 2007/0002942 | A1 | * | 1/2007 | Simpson et al. ............... 375/229 |
| 2007/0064776 | A1 | * | 3/2007 | Feller et al. ................... 375/149 |
| 2009/0225916 | A1 | * | 9/2009 | Ozawa .......................... 375/355 |

OTHER PUBLICATIONS

Floyd M. Gardner, A BPSK/QPSK Timing-Error Detector for Sampled Receivers, IEEE Transactions on communications, Vol. com-34, No. 5, May 1986.

* cited by examiner

*Primary Examiner* — Chieh M Fan
*Assistant Examiner* — Aristocratis Fotakis
(74) *Attorney, Agent, or Firm* — Charles Bergere

(57) ABSTRACT

A method and system for compensating for the effect of phase drift in a data sampling clock during data transfer between sub-systems of an electronic device. The sub-systems of the electronic device transfer data frame by frame. Each frame includes multiple data windows. Each data window includes multiple data bits. The method includes sampling each of the one or more data bits of a data window at one or more early instances, a prompt instance, and one or more late instances. Further, the method includes calculating the phase-error value of the sampled data window, based on the data sampled. Furthermore, the method includes compensating for the effect of phase drift in the data sampling clock, based on the calculated phase error value.

5 Claims, 5 Drawing Sheets

METHOD AND SYSTEM FOR COMPENSATING FOR THE EFFECT OF PHASE DRIFT IN A DATA SAMPLING CLOCK

BACKGROUND OF THE INVENTION

The present invention relates generally to sub-systems of an electronic device, and more specifically, to a method and system for compensating for the effect of phase drift in a data sampling clock used in an electronic device.

An electronic device can include numerous sub-systems that transfer data between each other. For example, most electronic devices used in data/voice communication include a transceiver sub-system. A typical transceiver sub-system used in digital wireless communications includes, in addition to other elements, a Radio Frequency Integrated Circuit (RFIC) and a Baseband Integrated Circuit (BBIC). The RFIC and BBIC exchange data and control signals through a standard digital interface. This data is transferred frame by frame. Each frame consists of multiple data windows. Each data window consists of multiple data bits. The RFIC and BBIC use a data sampling clock to sample each of the received data bits. It is desired that the instance at which a data bit is sampled by the data sampling clock should be such that the data sampled is correct. At the start of each frame synchronizing data is sent by the sub-system sending the frame to acquire the instance at which data is sampled by the data sampling clock. Sometimes, the data sampling instance gets drifted due to jitter in a Phase-Locked Loop (PLL) attached to a clock generating unit of the electronic device. The jitter is a variation in the data sampling clock caused by variation characteristics such as interval between successive cycles, amplitude or frequency. This drift causes an error in the data sampled by the data sampling clock and also affects the bit error rate of the digital interface.

Currently, there are several methods available for compensating for the effect of phase drift in the data sampling clock, due to jitter in the Phase-Locked Loop (PLL). One of these methods samples data at three instances, namely, a bit sampling instance, an instance occurring prior to the bit sampling instance, and an instance occurring after the bit sampling instance. After sampling the data at these instances, the method compares the data sampled at the bit sampling instance and the data sampled at the instance prior to the bit sampling instance. The method also compares the data sampled at the bit sampling instance and the data sampled at the instance after the bit sampling instance. The result of this comparison is used to compensate for the effect of phase drift in the data sampling clock. However, this method is not accurate as data is sampled at minimal number of instances. Further, the method can be used only if you have multiple bits for quantization of the sampled data.

BRIEF DESCRIPTION OF THE DRAWINGS

The following detailed description of preferred embodiments of the present invention will be better understood when read in conjunction with the appended drawings. The present invention is illustrated by way of example and not limited by the accompanying figures, in which like references indicate similar elements.

DETAILED DESCRIPTION OF THE PRESENT INVENTION

Figure 1:
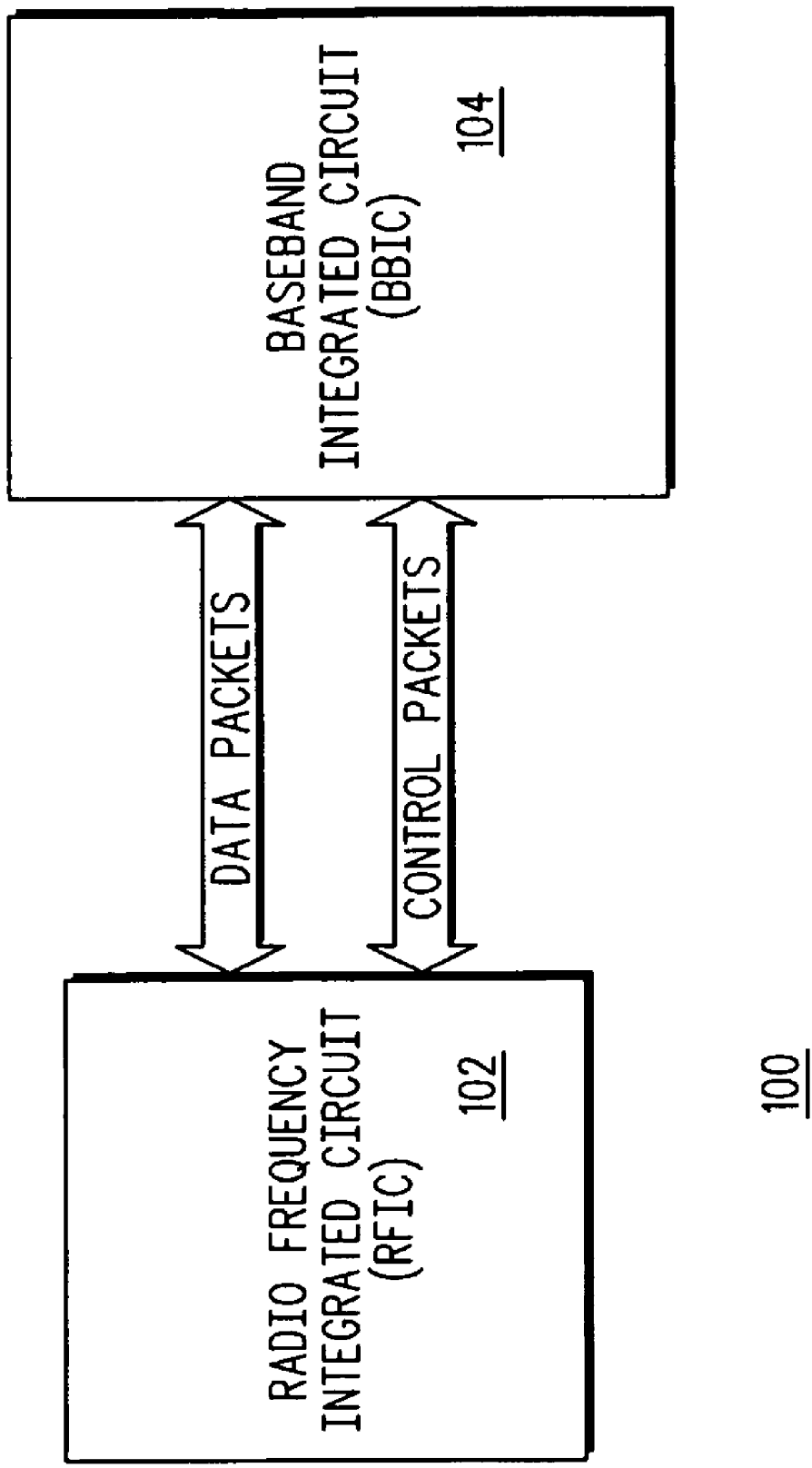
FIG. 1 is a block diagram illustrating data transfer between sub-systems in a transceiver of an electronic device used in a digital wireless communication system, in accordance with an embodiment of the present invention.

The detailed description, in connection with the appended drawings, is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a method for compensating for the effect of phase drift in a data sampling clock is provided. Data is transferred between sub-systems of an electronic device, frame by frame. Each frame includes a plurality of data windows. Each of the plurality of data windows includes one or more data bits. The method includes sampling each of one or more data bits of a data window at one or more early instances, a prompt instance, and one or more late instances. The prompt instance is a bit sampling instance. Each of the one or more early instances occurs prior to the prompt instance and each of the one or more late instances occurs after the prompt instance. Further, the method includes calculating a phase error value for the sampled data window, based on the data sampled for each of the one or more data bits. Thereafter, the effect of phase drift in the data sampling clock is compensated for, based on the calculated phase error value.

In another embodiment of the present invention, a system for compensating for the effect of phase drift in a data sampling clock during data transfer between sub-systems in an electronic device is provided. The sub-systems of the electronic device exchange data, frame by frame. Each frame includes a plurality of data windows. Each of the plurality of data windows includes one or more data bits. The system includes a multiphase detector and a processor. The multiphase detector samples each of the one or more received data bits of a data window at one or more early instances, a prompt instance, and one or more late instances. The prompt instance is a bit sampling instance. Each of the one or more early instances occurs prior to the prompt instance. Each of the one or more late instances occurs after the prompt instance. The processor calculates a phase error value for the sampled data window based on the data sampled for each of the one or more data bits. Further, the processor compensates for the effect of phase drift in the data sampling clock, based on the calculated phase error value.

Embodiments of the present invention provide a method and system for compensating for the effect of phase drift in a data sampling clock. The present method and system uses digital signals of the sampled data to compensate for the effect of the phase drift. The present method provides a reduced Bit Error Rate (BER), since each data bit is sampled at various instances by the data sampling clock. The reduced BER relaxes the design requirements of the PLL used to generate the data sampling clock. The present invention also provides a throughput improvement in data transfer between sub-systems due to the reduced BER. For example, the maximum packet length that can be transferred without resynchronization can be increased to 512 or 1024 bits.

Referring now to FIG. 1, a block diagram illustrating data transfer between sub-systems in a transceiver 100 of an electronic device used in a digital wireless communication system is shown, in accordance with an embodiment of the present invention. Examples of the electronic device include, but are not limited to, a Third Generation (3G) mobile phone, a cordless telephone, a global positioning system (GPS), a pager, and a two way radio. The transceiver 100, shown in FIG. 1 is an exemplary representation of data transfer between the sub-systems of the transceiver 100 and should not be considered as limiting to the scope of the present invention. The transceiver 100 includes a Radio Frequency Integrated Circuit (RFIC) 102 and a Baseband Integrated Circuit (BBIC) 104. The RFIC 102 operates within the radio frequency range and communicates with external electronic devices through a transmission link. The RFIC 102 is operatively coupled to the BBIC 104. The BBIC 104 operates on a baseband frequency and performs various data processing operations such as encoding, decoding, (demodulation, (de) interleaving, and the like. When the RFIC 102 receives external data, it provides a baseband signal to the BBIC 104 by extracting the carrier component of the radio frequency. Similarly, the RFIC 102 sends data to the external communication device by adding the carrier component in the baseband frequency provided by the BBIC 104.

In an embodiment of the present invention, the transceiver 100 includes an asynchronous Third Generation Digital Radio Frequency Interface (3GDigRF) for data transfer between the RFIC 102 and the BBIC 104. For the purpose of this description, the data transfer between the RFIC 102 and the BBIC 104 is described in compliance with the 3GDigRF interface. It will be apparent to a person skilled in the art that the present invention can also be applied to other data interfaces where synchronization is required among the various sub-systems of the electronic device. Data is transferred between the RFIC 102 and the BBIC 104, frame by frame. Each frame includes a plurality of data windows. Each data window includes one or more data bits. The arrangement of the data windows is explained in conjunction with FIG. 2. In an example, a 16 bit sequence of 1010100001001011 is sent from the RFIC 102 to the BBIC 104 at the start of each frame. This bit sequence is used to obtain the correct phase at which data is sampled by a data-sampling clock. The data sampling clock is present in the RFIC 102 and the BBIC 104. Whenever data is transferred from the RFIC 102 to the BBIC 104, it is sampled by the data sampling clock present in the BBIC 104. Whenever data is transferred from the BBIC 104 to the RFIC 102, it is sampled by the data sampling clock present in the RFIC 102. In an embodiment of the present invention, the data sampling clock is generated in the RFIC 102 by a Phase-Locked Loop (PLL). A PLL is a closed-loop feedback control system that generates and outputs a signal in relation to the frequency and phase of the reference signal. A PLL circuit responds to both the frequency and the phase of the reference signals, automatically raising or lowering the frequency of PLL circuit until it is matched to the reference in both the frequency and the phase. Sometimes, the phase at which data is sampled by the data sampling clock drifts, resulting in an error in the sampled data, due to jitter in the PLL. In order to compensate for this phase drift, a phase error value is calculated over a data window by sampling each data bit of the data window at various instances. The calculation of the phase error value is explained in conjunction with FIGS. 4 and 5. The sampling of a data bit at various instances is explained with the help of FIG. 2.

Figure 2:
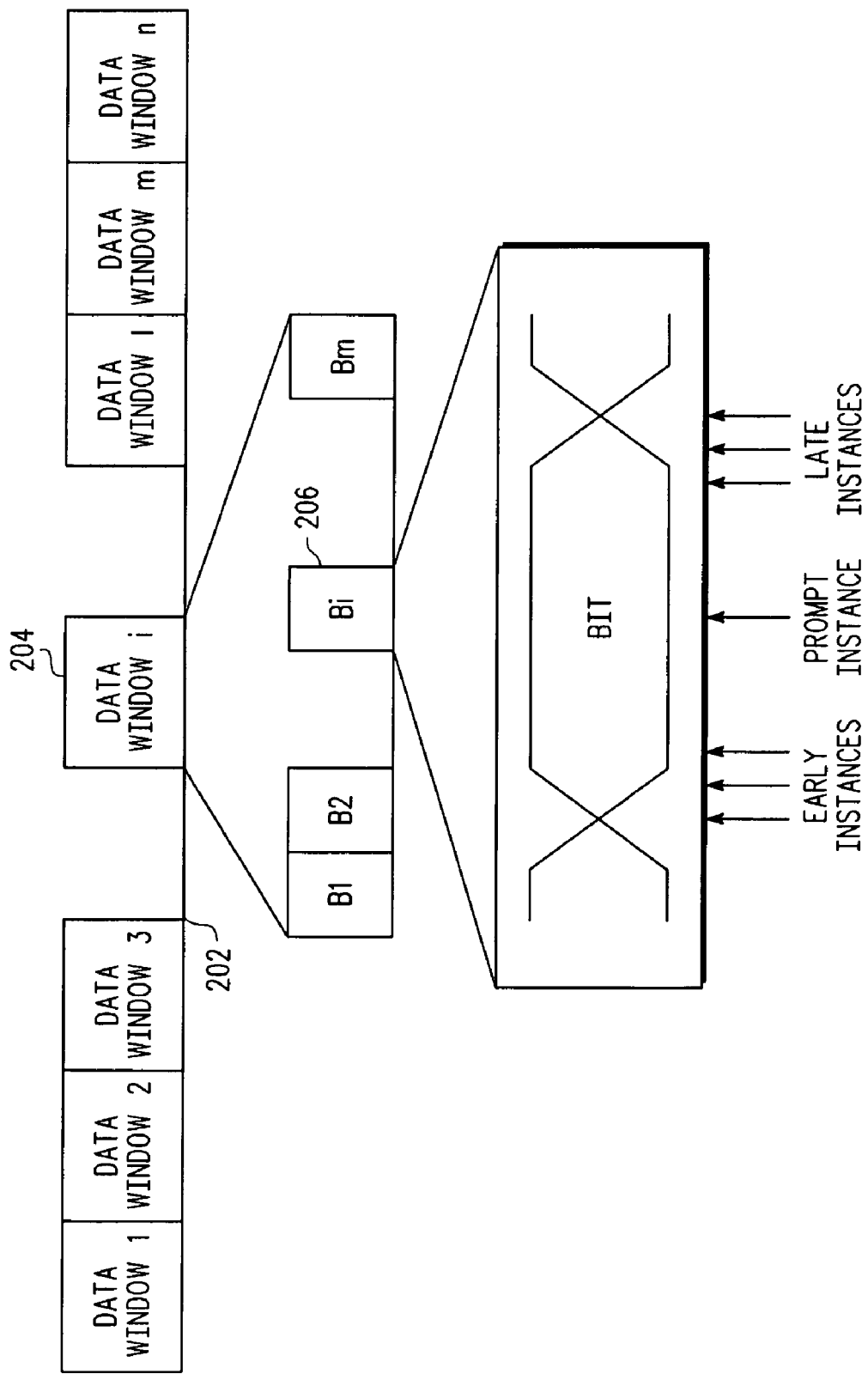
FIG. 2 is a schematic diagram illustrating the instances at which data is sampled by a data sampling clock, in accordance with an embodiment of the present invention.

Referring now to FIG. 2, a schematic diagram illustrating the instances at which data is sampled by a data sampling clock is shown, in accordance with an embodiment of the present invention. The schematic diagram 200 illustrates a frame 202, which includes a plurality of data windows. The frame 202, shown in FIG. 2, includes n (n is an integer number and $n \geq 2$) data windows. These data windows are represented in FIG. 2 as data window, data window$_2$, data window$_3$ . . . data window$_i$ . . . data window$_n$. Data window$_i$ includes multiple data bits and is represented as data window 204. The data bits are represented as $B_1$-$B_m$ (where m is an integer number and $m \geq 1$). The data bit$_i$ is represented as data bit 206 in FIG. 2. In an embodiment of the present invention, the schematic diagram illustrates sampling instances of the data bit 206. The data bit 206 is sampled at a bit sampling instance represented as the prompt instance. The prompt instance is the instance at which data is sampled by the data sampling clock, to obtain the correct value of a data bit. The data bit 206 is also sampled at one or more early instances and one or more late instances.

As shown in the FIG. 2, each of the one or more early instances occurs prior to the prompt instance, and each of the one or more late instances occurs after the prompt instance. In a typical electronic device, the data sampled at the prompt instance, the one or more early instances, and the one or more late instances is the same when the phase drift in the data sampling clock is zero. In another embodiment, the data sampled at the one or more early instances can be different from the data sampled at the prompt instance when the phase drift is positive. In yet another embodiment, the data sampled at the one or more late instances can be different from the data sampled at the prompt instance when the phase drift is negative. The data sampled at these instances for each data bit of the data window 204 is used to calculate the phase error value over the data window 204. The calculation of the phase error value is explained in conjunction with FIGS. 3, 4 and 5. The calculated phase error value is used to compensate for the effect of the phase drift in the data sampling clock.

In FIG. 2, the three early instances and the three late instances shown, at which the data is sampled, are for exemplary purposes only, and are not limiting to the scope of the invention. It will be apparent to a person skilled in the art that data can be sampled at fewer or greater number of instances than the three early instances and fewer or greater number of instances than the three late instances.

Figures 3, 4:
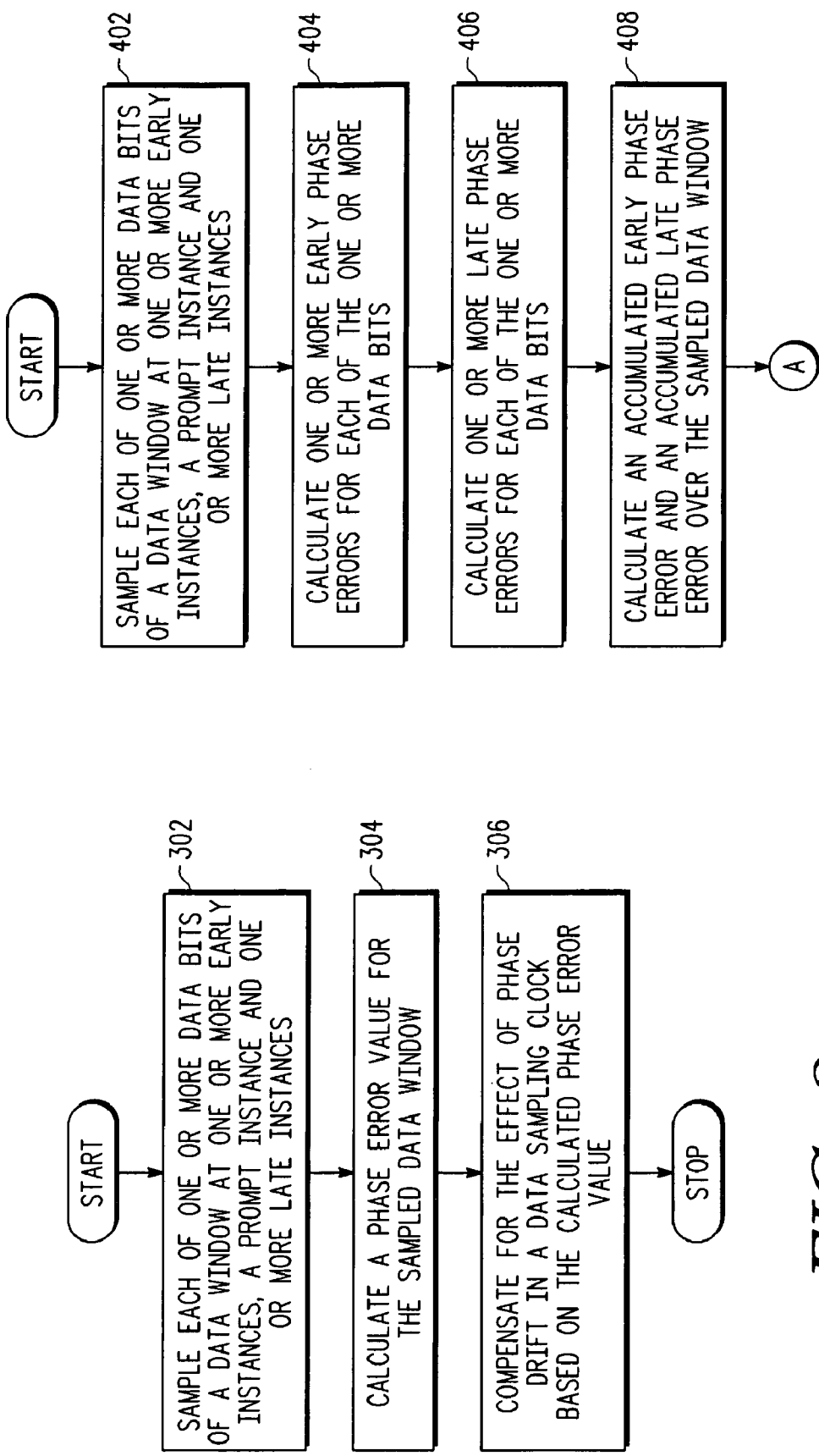
FIG. 3 is a flowchart of a method for compensating for the effect of phase drift in a data sampling clock, in accordance with an embodiment of the present invention.
FIGS. 4 and 5 is a flowchart of a detailed method for compensating for the effect of phase drift in a data sampling clock, in accordance with an embodiment of the present invention.

Referring now to FIG. 3, a flowchart illustrating a method for compensating for the effect of phase drift in a data sampling clock is shown, in accordance with an embodiment of the present invention. The data sampling clock samples data whenever data is transferred from the RFIC 102 to the BBIC 104 or from the BBIC 104 to the RFIC 102. In an embodiment, synchronizing data is sent by the BBIC 104 to the RFIC 102 at the start of each frame, to obtain the correct phase at which data is sampled by the data sampling clock. Sometimes the phase at which the data is sampled drifts due to jitter in the PLL. This drift causes an error in the sampled data. In an embodiment, the present invention provides the following method steps to compensate for the effect of this phase drift.

At step 302, each of one or more data bits of a data window are sampled at one or more early instances, a prompt instance, and one or more late instances. Each of the one or more early instances occurs prior to the prompt instance. Each of the one or more late instances occurs after the prompt instance. At step 304, a phase error value is calculated for the sampled data window. The phase error value is calculated based on the data sampled for each of the one or more data bits at the one or more early instances, the prompt instance and the one or more late instances. At step 306, the phase drift in the data sampling clock is compensated for, based on the calculated phase error value. In an embodiment, the phase drift in the data sampling clock is compensated for by shifting the position of the prompt instance based on the calculated phase error value. For example, the position of the prompt instance is shifted in the direction of the phase drift by a value equivalent to the calculated phase error value or by a pre-determined fixed value. Phase is shifted by one in either direction depending upon whether phase error was found in early direction or late direction.

Figure 5:
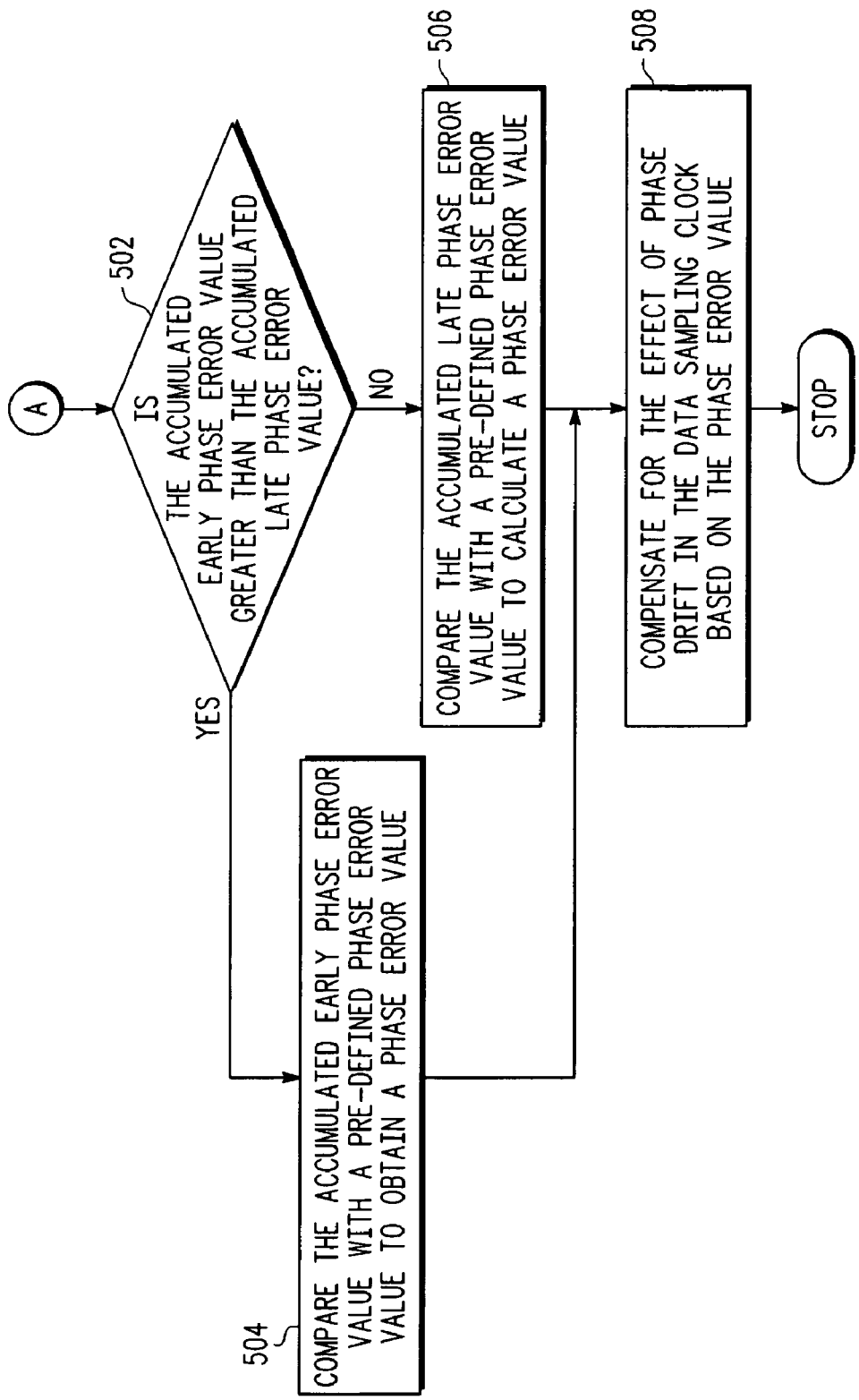

Referring now to FIGS. 4 and 5, a flowchart illustrating a detailed method for compensating for the effect of phase drift in a data sampling clock is shown, in accordance with another embodiment of the present invention. The data sampling clock samples data when data is transferred between the RFIC 102 and the BBIC 104. Each frame includes a plurality of data windows. Each data window includes one or more data bits.

At step 402, each of one or more data bits of a data window are sampled at one or more early instances, a prompt instance, and one or more late instances. Each of the one or more early instances occurs prior to the prompt instance. Each of the one or more late instances occurs after the prompt instance. In the event of the occurrence of phase drift in the data sampling clock, the data sampled at the prompt instance can be different from the data sampled at the early instances and the late instances.

At step 404, one or more early phase error values are calculated for each of the one or more data bits. In an embodiment of the present invention, the one or more early phase error values for a data bit are calculated by comparing the data sampled at the prompt instance with the data sampled at each of the one or more early instances. In an example, the early phase error values for a data bit are calculated by subtracting the data sampled at the prompt instance with the data sampled at each of the one or more early instances. At step 406, one or more late phase error values are calculated for each of the one or more data bits by comparing the data sampled at the prompt instance with the data sampled at each of the one or more late instances. At step 408, absolute values of the one or more early phase error values for each of the one or more data bits are added, to obtain an accumulated early phase error value. Similarly, absolute values of the one or more late phase error values for each of the one or more data bits are added to obtain an accumulated late phase error value.

At step 502, the accumulated early phase error value is compared with the accumulated late phase error value. It will be obvious to a person skilled in that art that when the accumulated early phase error value and the accumulated late phase error value are zero, phase drift in the data sampling clock is zero. Therefore, compensation is not required. When the accumulated early phase error value is greater than the accumulated late phase error value, step 504 is executed. At step 504, the accumulated early phase error value is compared with a pre-defined phase error value, to obtain the phase error value. In this embodiment, the phase error value is calculated by subtracting the accumulated early phase error value from the pre-defined phase-error value. In an example, the pre-defined phase-error value is an offset error value with a tolerable range, i.e., the pre-defined phase-error value specifies the maximum permissible value of phase drift in a data sampling clock. Similarly, when the accumulated early phase error value is less than the accumulated late phase error value, step 506 is executed. At step 506, the accumulated late phase error value is compared with the pre-defined phase error value, to obtain the phase error value. In this embodiment, the phase error value is calculated by subtracting the accumulated late phase error value from the pre-defined phase error value. At step 508, the phase drift in the data sampling clock is compensated for, based on the phase error value. In an embodiment, the phase drift in the data sampling clock is compensated for by shifting the position of the prompt instance, based on the calculated phase error value. For example, the position of prompt instance is drifted in direction of the phase drift by a value that is equivalent to the calculated phase error value or a pre-determined fixed value. In this example, the position of the prompt instance is drifted in the positive direction when the phase drift is in the positive direction.

Figure 6:
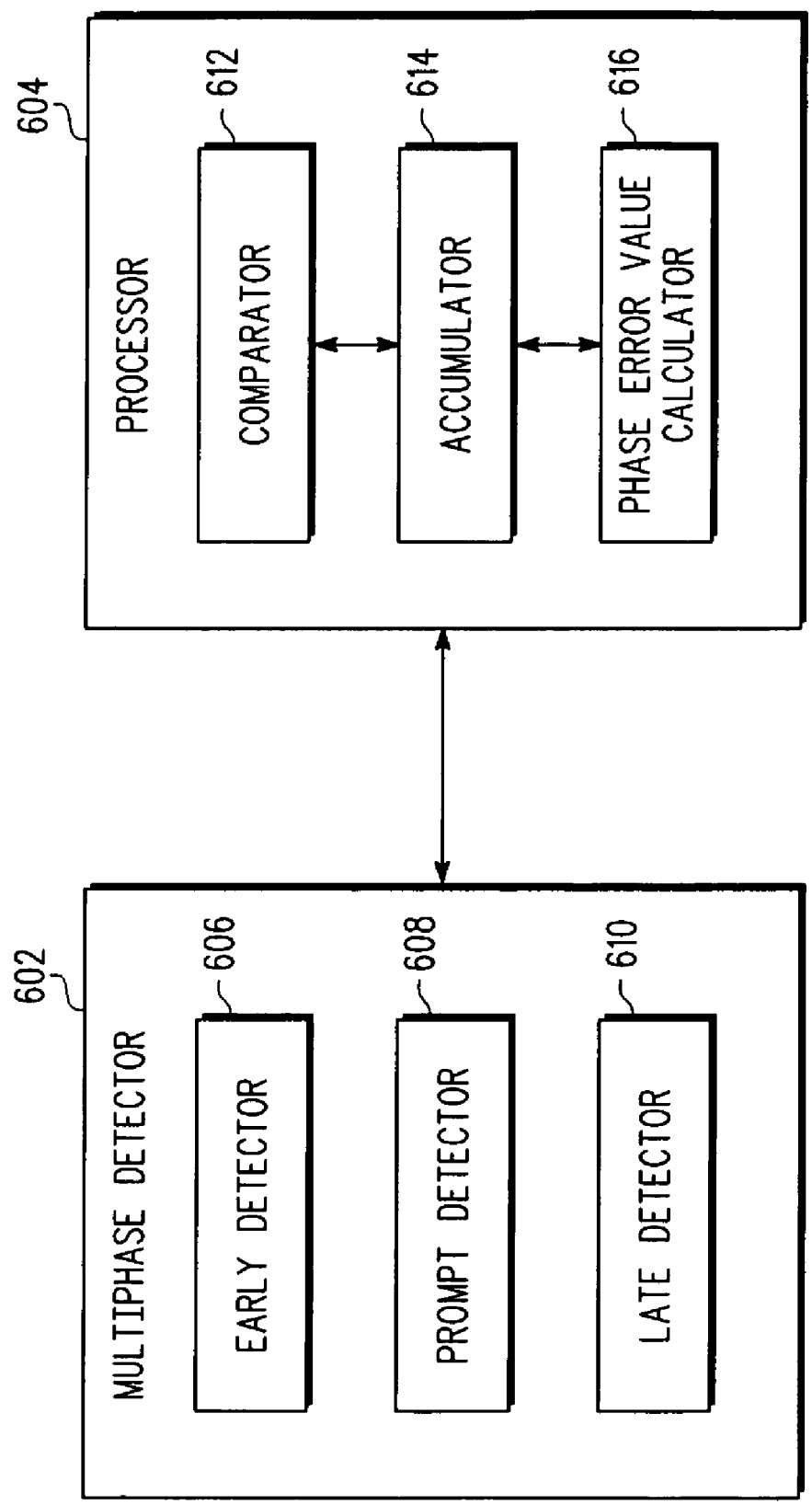
FIG. 6 is a block diagram of a system for compensating for the effect of phase drift in a data sampling clock, in accordance with an embodiment of the present invention.

Referring now to FIG. 6, a block diagram of a system for compensating for the effect of phase drift in a data sampling clock is shown, in accordance with an embodiment of the present invention. In an embodiment, the block diagram can be a part of the RFIC 102 or the BBIC 104. The system includes a multiphase detector 602 and a processor 604. The multiphase detector 602 is operatively coupled to the processor 604. The multiphase detector 602 samples each of one or more data bits of a data window at one or more early instances, a prompt instance, and one or more late instances. The prompt instance is a bit sampling instance. Each of the one or more early instances occurs prior to the prompt instance. Each of the one or more late instances occurs after the prompt instance. The multiphase detector 602 includes an early detector 606, a prompt detector 608 and a late detector 610. The early detector 606 samples data at the one or more early instances. The prompt detector 608 samples data at the bit sampling instance. The late detector 610 samples data at the one or more late instances. The processor 604 calculates a phase error value for the sampled data window based on the data sampled for each of the one or more data bits at the one or more early instances, the prompt instance and the one or late instances. The processor 604 also compensates the effect of phase drift in the data sampling clock based on the calculated phase error value.

The processor 604 includes a comparator 612, an accumulator 614 and a phase error value calculator 616. The comparator 612 is operatively coupled to the accumulator 614. The accumulator 614 is operatively coupled to the phase error value calculator 616. The comparator 612 compares the data sampled at the one or more early instances with the data sampled at the prompt instance to obtain one or more early phase error values. The comparator 612 also compares the data sampled at the one or more late instances with the data sampled at the prompt instance to obtain one or more late phase error values. The accumulator 614 adds absolute values of the one or more early phase error values over a data window, to obtain an accumulated early phase error value. The accumulator 614 also adds the one or late phase error values over a data window to obtain an accumulated late phase error value.

The phase error value calculator 616 calculates the phase error value, based on at least one of the accumulated early phase values, the accumulated late phase error value, and a pre-defined phase error value. In an embodiment, the phase error value calculator 616 compares the accumulated early phase error value with the accumulated late phase error value. In this embodiment, the phase error value calculator 616 subtracts the accumulated early phase error value from the pre-defined phase-error value, to obtain the phase error value when the accumulated early phase error value is greater than the accumulated late phase error value. In another embodiment, when the accumulated late phase error value is greater than the accumulated early phase error value, the phase error value calculator 616 subtracts the accumulated late phase error value with the pre-defined phase error value to calculate the phase error value.

The processor 604 compensates for the effect of phase drift in the data sampling clock, based on the calculated phase error value. In an embodiment, the processor 604 drifts the position of the prompt instance by a value that is equivalent to the calculated phase error value in the direction of the phase drift or by a pre-determined fixed value. For example, when the phase drift is in the positive direction, the position of the prompt instance is drifted in the positive direction.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A method for compensating for the effect of phase drift in a data sampling clock during data transfer between sub-systems of an electronic device, the sub-systems of the electronic device transferring the data frame by frame, each frame comprising a plurality of data windows, each of the plurality of data windows comprising one or more data bits, the method comprising:
    sampling each of the one or more data bits of a data window at one or more early instances, a prompt instance and one or more late instances, wherein the prompt instance is a bit sampling instance, and wherein each of the one or more early instances occurs prior to the prompt instance and each of the one or more late instances occurs after the prompt instance;
    calculating a phase error value for the sampled data window based on the data sampled for each of the one or more data bits at the one or more early instances, the prompt instance and the one or more late instances; and
    compensating for the effect of phase drift in the data sampling clock based on one of the calculated phase error value or a pre-determined fixed value,
    wherein the step of calculating the phase error value for the sampled data window comprises:
        calculating one or more early phase error values for each of the one or more data bits, wherein the one or more early phase error values is a difference between the data sampled at the one or more early instances and the data sampled at the prompt instance;
        calculating one or more late phase error values for each of the one or more data bits, wherein the one or more late phase error values is a difference between the data sampled at the one or more late instances and the data sampled at the prompt instance; and
        calculating the phase error value for the sampled data window based on the one or more early phase error values and the one or more late phase error values, and
    wherein the step of calculating the phase error value for the sampled data window comprises:
        adding absolute values of the one or more early phase error values over the sampled data window to obtain an accumulated early phase error value;
        adding absolute values of the one or more late phase error values over the sampled window to obtain an accumulated late phase error value; and
        calculating the phase error value for the sampled data window based on at least one of the accumulated early phase error value and the accumulated late phase error value.

2. The method for compensating for the effect of phase drift in a data sampling clock of claim 1, wherein the step of calculating the phase error value for the sampled data window comprises:
    comparing the accumulated early phase error value with the accumulated late phase error value to obtain a data window phase error value; and
    comparing the data window phase error value with a pre-defined phase error value to obtain the phase error value.

3. The method for compensating for the effect of phase drift in a data sampling clock of claim 1, wherein the step of compensating for the effect of phase drift in the data sampling clock comprises shifting the position of the prompt instance based on the calculated phase error value.

4. A system for compensating for the effect of phase drift in a data sampling clock during data transfer between sub-systems of an electronic device, the sub-systems of the electronic device transferring the data frame by frame, each frame comprising a plurality of data windows, each of the plurality of data windows comprising one or more data bits, the system comprising:
    a multiphase detector that samples each of the one or more data bits of a data window at one or more early instances, a prompt instance and one or more late instances, wherein the prompt instance is a bit sampling instance, and wherein each of the one or more early instances occurs prior to the prompt instance and each of the one or more late instances occurs after the prompt instance; and
    a processor that calculates a phase error value for the sampled data window based on the data sampled for each of the one or more data bits at the one or more early instances, the prompt instance and the one or more late instances and compensates the effect of phase drift in the data sampling clock based on the phase error value,
    wherein the processor comprises:
        a comparator that compares the data sampled at the one or more early instances and the data sampled at the one or more late instances with the data sampled at the prompt instance to obtain one or more early phase error values and one or more late phase errors values respectively for each of the one or more data bits;
        an accumulator that accumulates absolute values of the one or more early phase error values over the sampled data window to obtain an accumulated early phase error value, and adds absolute values of the one or more late phase error values over the sampled data window to obtain an accumulated late phase error value; and
        a phase error value calculator that calculates the phase error value based on at least one of the accumulated early phase error value, the accumulated late phase error value and a pre-defined phase error value.

5. The system for compensating for the effect of phase drift in the data sampling clock of claim 4, wherein the multiphase detector comprises:
    an early detector that samples data at the one or more early instances;
    a prompt detector that samples data at the prompt instance; and
    a late detector that samples data at the one or more late instances.

* * * * *